(12) United States Patent  
Van Der Knaap

(10) Patent No.: US 7,909,341 B2
(45) Date of Patent: Mar. 22, 2011

(54) SUSPENSION SYSTEM FOR A VEHICLE

(75) Inventor: Albertus Clemens Maria Van Der Knaap, Helmond (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 141 days.

(21) Appl. No.: 12/302,841

(22) PCT Filed: May 29, 2007

(86) PCT No.: PCT/NL2007/050248
§ 371 (c)(1),
(2), (4) Date: Apr. 30, 2009

(87) PCT Pub. No.: WO2007/139380
PCT Pub. Date: Dec. 6, 2007

(65) Prior Publication Data
US 2009/0206561 A1    Aug. 20, 2009

(30) Foreign Application Priority Data

May 29, 2006    (EP) .................................... 06076123

(51) Int. Cl.
*B60G 21/073*    (2006.01)
*B60G 17/04*    (2006.01)
(52) U.S. Cl. .......... 280/124.106; 280/5.508; 280/124.16
(58) Field of Classification Search ........... 280/124.106, 280/124.16, 124.161, 5.506–5.509
See application file for complete search history.

(56) References Cited

U.S. PATENT DOCUMENTS
5,195,772 A * 3/1993 Bachrach et al. .......... 280/5.501
(Continued)

FOREIGN PATENT DOCUMENTS
DE    195 21 746 A1    12/1996
(Continued)

OTHER PUBLICATIONS
International Search Report for PCT/NL2007/050248 dated Sep. 11, 2007.

*Primary Examiner* — Ruth Ilan
(74) *Attorney, Agent, or Firm* — Leydig, Voit & Mayer, Ltd

(57) ABSTRACT

Suspension system for a vehicle, comprising two hydraulic piston-cylinder units (1) comprising a first and a second cylinder chamber (3a, 3b), connected with electro-hydraulic roll control means which are arranged to control the vehicle's roll behavior under electric control of the vehicle's computer system (C), comprising a direction valve, a pump unit and pressure control means. The direction valve is a hydraulically actuatable direction valve (6) having two first and two second switching ports (6a, 6b), interconnectable in three positions, and two hydraulic control ports (6c) which are either indirectly or directly, connected with said pump unit (5, 10). The pressure control means comprise an uni-directional pressure control module (9, 15), connected with both second switching ports of the hydraulically actuatable direction valve. The pump unit is either a bidirectionally energizable pump unit (5) connected with both first switching ports (6a), or a unidirectionally energizable pump unit (10) connected with both second switching ports (6b) of the direction valve, via an electrically actuatable valve (11) having two first and two second, mutually interconnectable, switching ports (11a, 11b). At least a number of the hydraulic components (6, 9, 11, 13, 12, 14) may be integrated in one common housing (16).

8 Claims, 4 Drawing Sheets

U.S. PATENT DOCUMENTS

| | | | |
|---|---|---|---|
| 6,003,880 A * | 12/1999 | Kokotovic | 280/5.506 |
| 6,039,326 A * | 3/2000 | Agner | 280/5.506 |
| 6,264,212 B1 * | 7/2001 | Timoney | 280/5.51 |
| 6,533,294 B1 * | 3/2003 | Germain et al. | 280/5.511 |
| 2005/0146098 A1 * | 7/2005 | Green et al. | 280/5.508 |
| 2007/0013151 A1 * | 1/2007 | Grethel et al. | 280/5.508 |
| 2008/0111325 A1 * | 5/2008 | Grethel et al. | 280/5.508 |

FOREIGN PATENT DOCUMENTS

| | | |
|---|---|---|
| DE | 196 49 187 A1 | 5/1998 |
| DE | 101 11 551 A1 | 9/2002 |
| DE | 102 16 132 A1 | 10/2003 |
| EP | 0940274 A2 * | 9/1999 |
| GB | 2 337 730 A | 12/1999 |
| WO | WO 92/00203 A1 | 1/1992 |

\* cited by examiner

SUSPENSION SYSTEM FOR A VEHICLE

FIELD OF THE INVENTION

The invention concerns a suspension system for a vehicle, comprising two hydraulic piston-cylinder units, arranged to act as suspension damper/activator modules, each comprising a first cylinder chamber and a second cylinder chamber, the relevant cylinder chambers of each of said hydraulic piston-cylinder units being connected with electro-hydraulic roll control means which are arranged to control the vehicle's roll behavior under electric control of the vehicle's computer system, said roll control means comprising a direction valve, a pump unit and pressure control means.

BACKGROUND OF THE INVENTION

A suspension system as indicated above is amongst others known from DE10111551. The known suspension system comprises amongst others a unidirectionally driven pump unit, a set of pressure limiting valves and a double, electrically actuatable direction valve, connected with the piston-cylinder units.

Disadvantageous is that in practice the known system is rather complex and thus expensive and not extremely reliable.

SUMMARY OF THE INVENTION

It is an aim of the present invention to provide a suspension system which is less complex and less expensive and which is deemed to give better roll performances and suspension behavior.

According to the invention the suspension system as outlined above comprises a hydraulically actuatable direction valve which comprises two first and two second switching ports which are mutually interconnectable in three positions (also indicated as 4/3 valve), as well as two hydraulic control ports which are either indirectly or directly, connected with said pump unit. Moreover, said pressure control means preferably comprise an electrically actuatable, uni-directional pressure control valve which is under electric control of the vehicle's computer system, both second switching ports of the hydraulically actuatable direction valve being connected with said unidirectional pressure control valve. Contrary to the electrically actuatable direction valve in the prior art system, applying a direction valve which is controlled by the hydraulic pressure as supplied by said pump unit—and dynamically varying due to the roll behavior of the vehicle in action—results in better roll behavior and reliability. Moreover, connecting, as is preferred, the pressure control valve with the second switching ports of the direction valve, has the advantage that the pressure control valve can be a uni-directional one as will become more clear below.

Preferably, both first switching ports of the hydraulically actuatable direction valve are connected with both first chambers of the hydraulic piston-cylinder units, while one second switching port of the hydraulically actuatable direction valve is connected with both second chambers of the hydraulic piston-cylinder units and the other second switching port of the hydraulically actuatable direction valve is connected with a hydraulic buffer.

Preferably, the second chambers of the hydraulic piston-cylinder units are minor chambers at the side of the piston rod (due to that rod's volume), while the first chambers of said hydraulic piston-cylinder units are major chambers at the other side of the piston (due to the absence of the piston rod).

Preferably, said unidirectional pressure control valve is formed by (or at least comprises) an electrically actuatable resistance or orifice control valve which is under electric control of the vehicle's computer system, in combination with a flow control valve system which comprises a pressure control valve, controlling the pressure drop over a fixed resistance that is connected in series with said electrically actuatable resistance.

It may be preferred to connect the pump unit with both first switching ports of the hydraulically actuatable direction valve. In this configuration the pump unit has to be bidirectionally energizable, under control of the vehicle's computer system.

An alternative is to connect the pump unit with both second switching ports of the hydraulically actuatable direction valve. In this configuration a unidirectionally energizable pump unit can be used. However, to enable the control of the hydraulically actuatable direction valve via its hydraulic control ports the pump unit is indirectly connected with those hydraulic control ports, viz. via an electrically actuatable valve which is under electric control of the vehicle's computer system and which comprises two first switching ports and two second switching ports which are mutually interconnectable in two positions, which first switching ports of the valve are connected with the hydraulic control ports of the hydraulically actuatable direction valve and which second switching ports of the valve are connected with the unidirectionally energizable pump unit. By means of the electrically—under control of the vehicle's computer system—actuatable valve use can be made of a uni-directional pump, while the direction valve can be actuated in the right way.

Below a preferred embodiment of the suspension system will be discussed.

EXEMPLARY EMBODIMENT

Figure 1:
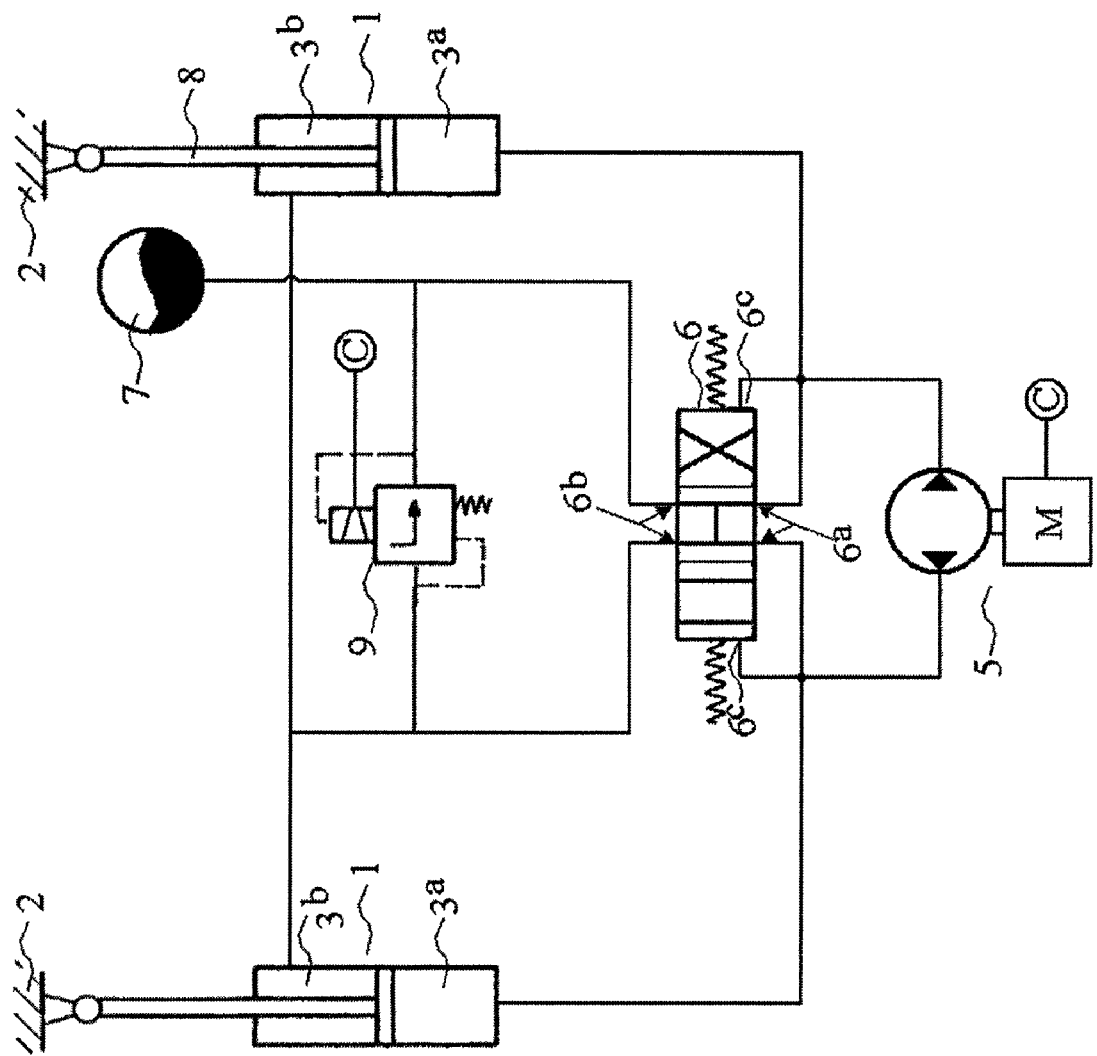
FIG. 1 shows schematically a first exemplary embodiment of a suspension system as outlined above.

The suspension system outlined in FIG. 1 comprises two hydraulic piston-cylinder units 1, arranged to act as suspension damper/activator modules for a vehicle 2. Each of them comprises a first cylinder chamber 3a and a second cylinder chamber 3b, the relevant cylinder chambers 3a,3b of each of said hydraulic piston-cylinder units 1 being connected with electro-hydraulic roll control means which are arranged to control the vehicle's roll behavior under electric control of the vehicle's computer system (not shown, but indicated by C). The roll control means comprise a direction valve, a pump unit 5 and pressure control means, discussed below more in detail.

In FIG. 1 the direction valve is, according to the invention, a hydraulically actuatable direction valve which comprises two first switching ports 6a and two second switching ports 6b which are mutually interconnectable in three positions (indicated by II, H, X respectively), as well as two hydraulic control ports 6c which are either directly (FIG. 1) or indirectly (see FIG. 2), connected with said pump unit 5.

Both first switching ports 6a of the hydraulically actuatable direction valve 6 are connected with both first chambers 3a of the hydraulic piston-cylinder units 1 which are mutually interconnected, while one second switching port 6*b* of the hydraulically actuatable direction valve 6 is connected with both second chambers 3*b* of the hydraulic piston-cylinder units 1 and the other second switching port 6*b* of the hydraulically actuatable direction valve 6 is connected with a hydraulic buffer 7. The second chambers 3*b* of the hydraulic piston-cylinder units are—due the volume of the piston rods 8—relative minor chambers, located at the side of the piston rods while the first chambers 3*a* of said hydraulic piston-cylinder units are major chambers at the other side of the piston. The terms "major" and "minor" cylinder chamber (3*a*, 3*b*) respectively originate from the fact that, due to the presence of the piston rod (8), the piston surface in the second ("minor") chamber (3*b*) is smaller then the piston surface in the first ("major") chamber (3*a*). Besides, the piston rod (8) itself occupies part of the volume of the second ("minor") chamber (3*b*). Of course it is clear that the volume of both chambers (also) depends on the actual position of the piston (8). When, at a certain moment, the piston would have a rather low position, the upper, "minor" chamber (3*b*) could have a larger volume than the lower, "major" chamber (3*a*). It may be preferred that the piston surface area on the side of the "major" chamber (3*a*) is about two times the piston surface area of the "minor" chamber (3*b*). This can be reached by selecting a piston rod (8) having a cross-sectional surface area which is equal to the (remaining) surface area of the piston at that side. In that case the surface of the piston at the other (bottom) side is twice as large.

The pressure control means comprise an electrically actuatable, uni-directional pressure control valve 9 which is under electric control of the vehicle's computer system (C). Both second switching ports 6*b* of the hydraulically actuatable direction valve 6 are connected with said unidirectional pressure control valve.

In FIG. 1 the pump unit 5 is a bidirectionally energizable pump unit which is connected with both first switching ports 6*a* of the hydraulically actuatable direction valve.

Figure 2:
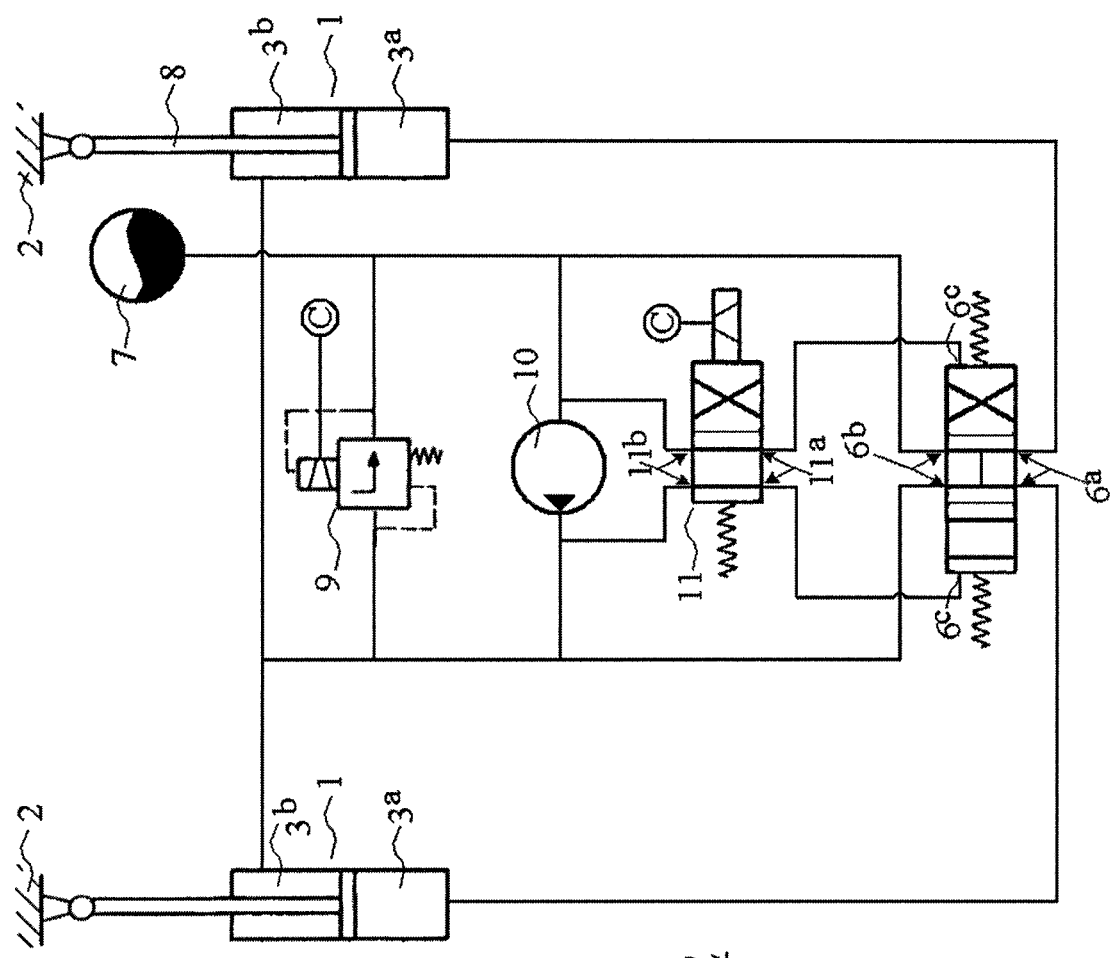
FIG. 2 shows schematically a second exemplary embodiment of a suspension system as outlined above.

It may be preferred to use a unidirectionally energizable pump unit as shown in FIG. 2 which is connected with both second switching ports 6*b* of the hydraulically actuatable direction valve 6. To provide a bidirectional hydraulic pressure source—amongst others used for regulation of the position of the direction valve 6—using a unidirectional pump unit in FIG. 2 the unidirectionally energizable pump 10 unit is connected with the hydraulic control ports 6*c* of the hydraulically actuatable direction valve 6 via an electrically actuatable valve 11 which is under electric control of the vehicle's computer system (C) and which comprises two first switching ports 11*a* and two second switching ports 11*b* which are mutually interconnectable in two positions. The first switching ports 11*a* of valve 11 are connected with the hydraulic control ports 6*c* of the hydraulically actuatable direction valve 6. The second switching ports 11*b* of valve 11 are connected with the unidirectionally energizable pump unit 10. In practice the use of a unidirectional pump unit 10 and an electrically operated change over valve 11 appears to be cheaper and more reliable than the use of a bidirectional pump unit 5. Moreover, the pump 10 could be driven non-electrically, but e.g. be energized—directly or indirectly—the vehicle's main (combustion) engine.

Figure 3:
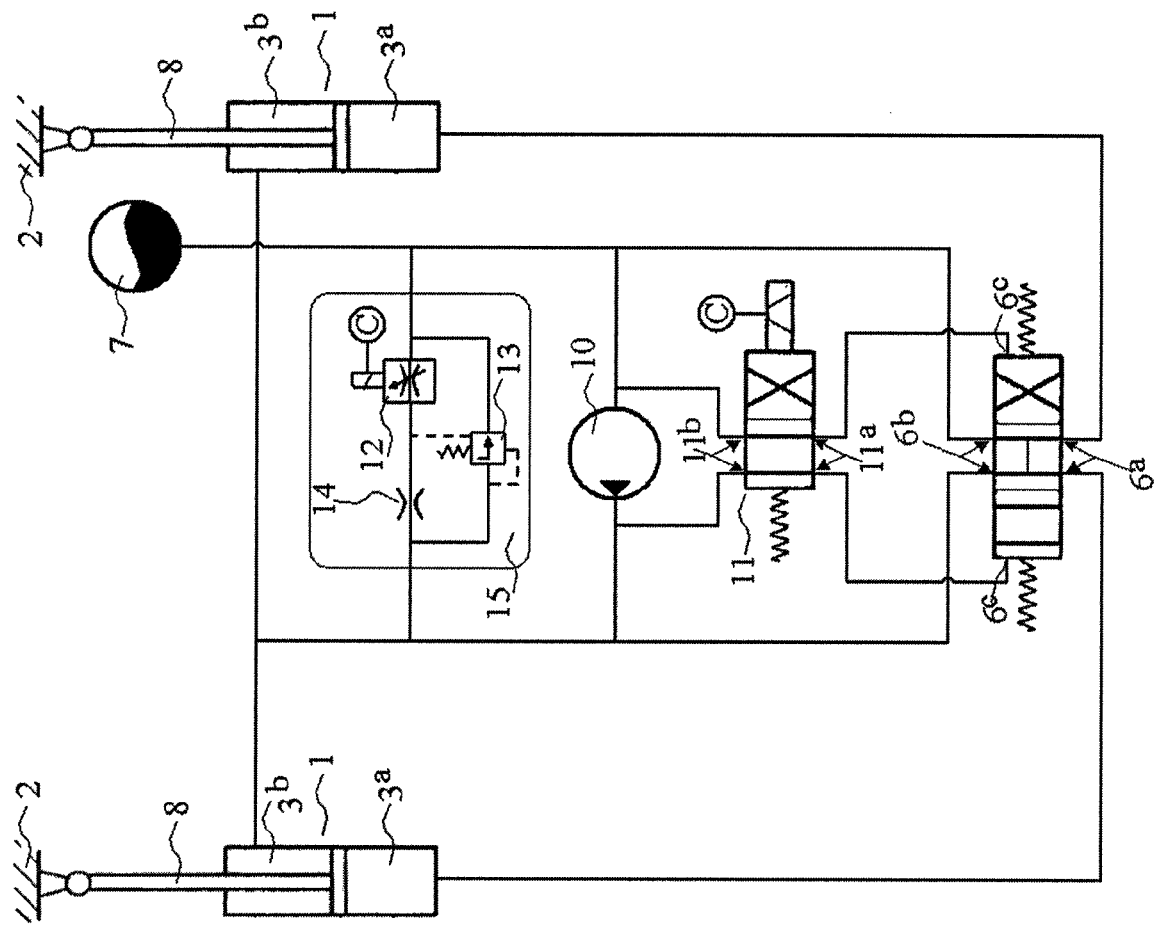
FIG. 3 shows schematically a third exemplary embodiment of a suspension system as outlined above.

Finally, FIG. 3 shows an embodiment in which the unidirectional pressure control valve 9 is replaced by a unidirectional pressure control module 15, which is formed by an electrically actuatable resistance 12 (or "orifice control valve") which is under electric control of the vehicle's computer system (C), in combination with a flow control valve system consisting of a pressure control valve 13 that controls the pressure drop over a fixed resistance 14 that is connected in series with said electrically actuatable resistance 12. The inlet of the pressure control valve 13 is connected with the input port of the fixed resistance 14 and its outlet to the output port of said electrically actuatable resistance 12. Consequently, this set-up yields electrical adjustment of degressive resistance characteristics and is less sensitive to road induced flow disturbances, greatly enhancing ride comfort.

It is noted that the circuits which are disclosed in the FIGS. 1 to 3 inclusive are very schematically. More details, including the use and place of non-return valves, damper valves etc. (not shown and discussed in this application) can be derived from the general documentation and from the prior art document DE10111551. Moreover, from the prior art it can derived that it may preferred that the effective surface of the piston in the minor chamber 3*b* is the half of the surface of the piston in the major chamber 3*a*.

Figure 4:
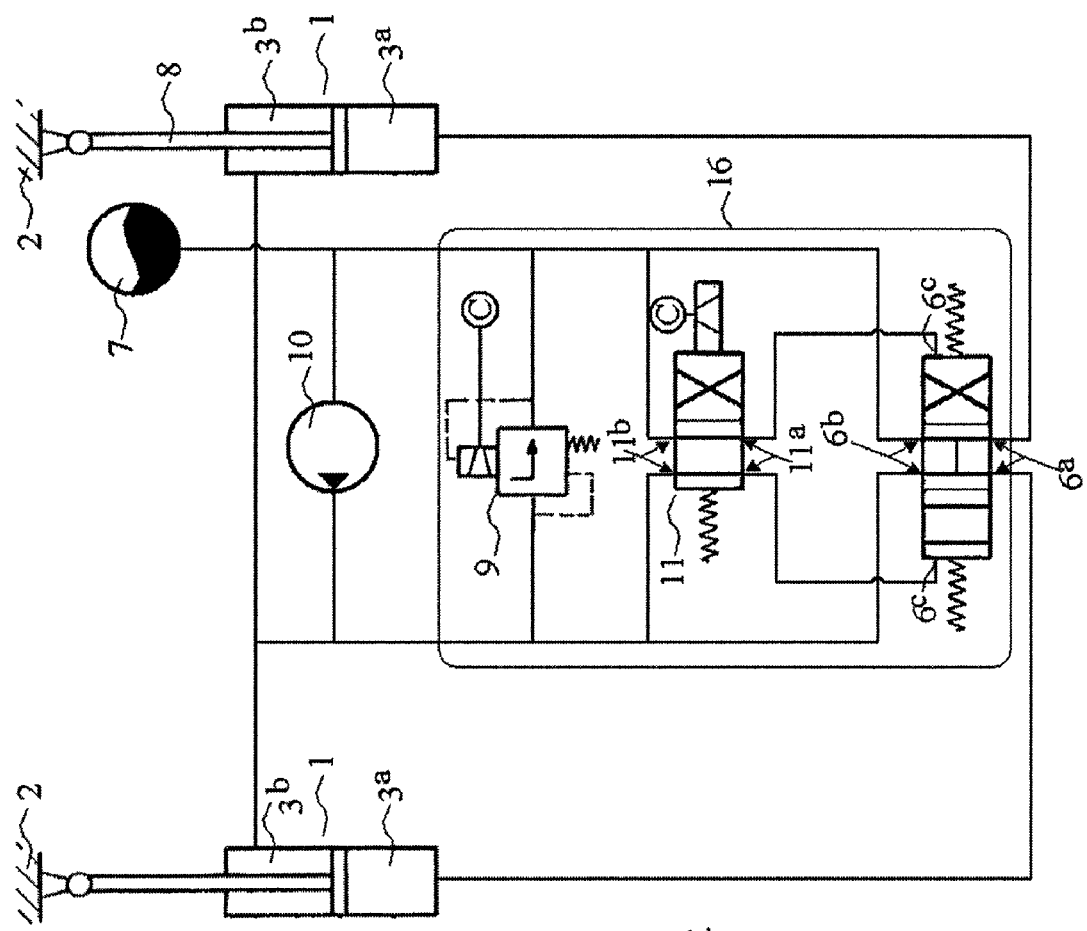
FIG. 4 shows schematically a preferred alternative for the second exemplary embodiment of a suspension system as outlined above.

Finally it is noted that various hydraulic components, like the valves 6, 9, 11, 13 and the resistances 12 and 14 lend themselves very well for integration into one common housing 16, resulting in short interconnection lines which cause better response properties, as well as in a more simple and reliable construction and better handling and mounting capabilities. This preferred embodiment is illustrated in FIG. 4 for the configuration of FIG. 2, but may also—mutatis mutandis—be applied for the configurations of FIGS. 1 and 3.

The invention claimed is:

1. A suspension system for a vehicle, comprising:
 two hydraulic piston-cylinder units, arranged to act as suspension damper/activator modules, each comprising a first cylinder chamber and a second cylinder chamber, the respective cylinder chambers of each of said two hydraulic piston-cylinder units being connected with an electro-hydraulic roll control which is arranged to control the vehicle's roll behavior under electric control of a computer system of the vehicle, said electro-hydraulic roll control comprising a direction valve, a pump unit and a pressure control,
 wherein the direction valve is a hydraulically actuatable direction valve which comprises two first switching ports and two second switching ports which are mutually interconnectable in three positions, as well as two hydraulic control ports which are connected, either indirectly or directly, with said pump unit, and
 moreover, said pressure control comprises an electrically actuatable, uni-directional pressure control module which is under electric control of the computer system, and both second switching ports of the hydraulically actuatable direction valve are connected with said uni-directional pressure control valve.

2. Suspension system according to claim 1, wherein both first switching ports of the hydraulically actuatable direction valve are connected with both first chambers of the hydraulic piston-cylinder units, while one second switching port of the hydraulically actuatable direction valve is connected with both second chambers of the hydraulic piston-cylinder units and the other second switching port of the hydraulically actuatable direction valve is connected with a hydraulic buffer.

3. Suspension system according to claim 1, wherein the second chambers of the hydraulic piston-cylinder units are minor chambers at the side of the piston rod while the first chambers of said hydraulic piston-cylinder units are major chambers at the other side of the piston.

4. Suspension system according to claim 1, wherein said uni-directional pressure control module comprises an electrically actuatable resistance which is under electric control of the vehicle's computer system, as well as a pressure control valve, arranged to control the pressure drop over a fixed resistance which is connected in series with said electrically actuatable resistance, the inlet of said pressure control valve being connected with the input port of said fixed resistance and its outlet being connected with the output port of said electrically actuatable resistance.

5. Suspension system according to claim 1, wherein the pump unit is a bidirectionally energizable pump unit which is connected with both first switching ports of the hydraulically actuatable direction valve.

6. Suspension system according to claim 1, wherein the pump unit is a unidirectionally energizable pump unit which is connected with both second switching ports of the hydraulically actuatable direction valve.

7. Suspension system according to claim 6, wherein the unidirectionally energizable pump unit is connected with the hydraulic control ports of the hydraulically actuatable direction valve via an electrically actuatable valve which is under electric control of the vehicle's computer system and which comprises two first switching ports and two second switching ports which are mutually interconnectable in two positions, which first switching ports of the valve are connected with the hydraulic control ports of the hydraulically actuatable direction valve and which second switching ports of the valve are connected with the unidirectionally energizable pump unit.

8. Suspension system according to claim 1 wherein at least two components of the electro-hydraulic roll control are integrated in one common housing.

* * * * *

UNITED STATES PATENT AND TRADEMARK OFFICE
CERTIFICATE OF CORRECTION

PATENT NO. : 7,909,341 B2
APPLICATION NO. : 12/302841
DATED : March 22, 2011
INVENTOR(S) : Van Der Knaap It is certified that error appears in the above-identified patent and that said Letters Patent is hereby corrected as shown below:

Title page

Item [73] Assignee: "Nederiandse Organisatie Voor Toegepast-natuurwetenschappelijk Onderzoek TNO" should be -- Nederlandse Organisatie Voor Toegepast-natuurwetenschappelijk Onderzoek TNO --

Signed and Sealed this
Seventh Day of June, 2011

David J. Kappos
*Director of the United States Patent and Trademark Office*